United States Patent [19]

Avitan

[11] Patent Number: 5,181,173

[45] Date of Patent: Jan. 19, 1993

[54] VARIABLE RATIO STEERING SYSTEM FOR A MOTOR VEHICLE

[75] Inventor: Isaac Avitan, Vestal, N.Y.

[73] Assignee: Raymond Corporation, Greene, N.Y.

[21] Appl. No.: 734,710

[22] Filed: Jul. 23, 1991

[51] Int. Cl.⁵ .............................................. B62D 5/04
[52] U.S. Cl. .............................. 364/424.05; 180/79.1; 180/142
[58] Field of Search ...................... 364/424.05; 280/91; 180/79.1, 140, 141, 142, 143

[56] References Cited

U.S. PATENT DOCUMENTS

| | | | |
|---|---|---|---|
| 4,572,316 | 2/1986 | Kanazawa et al. | 180/143 |
| 4,893,689 | 1/1990 | Laurich-Trost | 180/140 |
| 4,953,648 | 9/1990 | Ohmura | 180/140 |
| 4,953,650 | 9/1990 | Ohmura | 180/140 |
| 4,953,652 | 9/1990 | Ohmura et al. | 180/140 |

Primary Examiner—Gary Chin
Attorney, Agent, or Firm—Salzman & Levy

[57] ABSTRACT

The invention features an electronic feedback circuit for varying the steering ratio of a motorized material handling vehicle in response to the vehicular speed. The lock-to-lock turn of the steering wheel or column is electronically adjusted in order to modify the steering response (i.e., steering angle) of the steer/drive wheel with respect to an increase in speed of the vehicle. The steering ratio can be a straight-line function of vehicular speed.

11 Claims, 5 Drawing Sheets (a) - minimum speed threshold
(b) - maximum speed threshold
(c) - minimum steer ratio
(d) - maximum steer ratio

VARIABLE RATIO STEERING SYSTEM FOR A MOTOR VEHICLE

FIELD OF THE INVENTION

The invention is related to a system for changing the steering ratio of a steerable vehicle as a function of its speed, and more particularly to a microprocessor-based, electronic system that changes the lock-to-lock turns of the steering wheel or column, as the speed of a motorized vehicle increases.

BACKGROUND OF THE INVENTION

The present invention relates to a steering system for a motorized vehicle with particular emphasis on an electronic steering control for a material handling vehicle, such as fork lift truck.

It is desirable to increase the sensitivity of the steering of a motorized vehicle at low vehicular speeds in order to provide better maneuverability and parking control. At higher speeds the steering sensitivity should be decreased, since large displacements can result from small corrections. One of the best ways to influence the steering sensitivity is to change the steering ratio (i.e., the number of turns from lock-to-lock of the steering wheel or column).

It is further desirable to modify the steering sensitivity utilizing electronic rather than mechanical controls. An electronic steering control system has greater flexibility than a mechanical control system, and is lower in cost. For example, a mechanical control may require replacing or adjusting mechanical gearing, while an electronic system using a microprocessor-based control can be easily modified by changing programming parameters.

Electronic steering control is particularly useful for material handling vehicles, such as fork lift trucks. Such vehicles generally have integrally functioning drive and steering motors. Where the drive and steering functions are united in a common control system, a microprocessor control is an extremely flexible means of providing adjustments and control modifications.

DISCUSSION OF RELATED ART

In U.S. Pat. No. 4,940,102, issued to Morishita on Jul. 10, 1990, for "Motor-Driven Power Steering System," a DC motor provides an auxiliary steering force to a steering system based upon a steering torque signal and a vehicle speed signal. The rotational force necessary to control the steering of the vehicle is modified by a clutch mechanism that turns the DC motor on and off in response to the received signals.

The present invention differs from the above patent in that the modification to the steering control is based solely on the vehicular speed, which speed is used to modify the steering ratio (i.e., turns of the steering wheel from lock-to-lock), rather than the torque upon the steering wheel.

In U.S. Pat. No. 4,873,475, issued to Togo et al on Oct. 10, 1989, for "Electrically Powered Power Steering System for Industrial Vehicle or the Like," an electronic control is illustrated for preventing a kickback felt through the steering wheel when the steering motor is de-energized. The de-energization of the motor produces a condition wherein there is no countering force upon the steering shaft to oppose the twisted tires of the vehicle, which then tend to relieve any residual forces in the rubber. The patent teaches a control for gradual reduction in the steering torque to prevent the sudden kickback force.

SUMMARY OF THE INVENTION

In accordance with the present invention, there is provided a electronic feedback circuit under microprocessor control for varying the steering ratio of a motorized material handling vehicle in response to the vehicular speed. The lock-to-lock turn of the steering wheel or column is electronically adjusted in order to modify the steering response (i.e., steering angle) of the steer/drive wheel with respect to an increase in speed of the vehicle. The microprocessor controlled system comprises a vehicle velocity sensor that sends a signal of vehicular speed to a steer ratio filter. The steer ratio filter supplies an incremental change in the steering ratio for controlling the steer/drive wheel in response to the change sensed in the vehicular velocity. Such a change may be a straight-line function, in which case the steer ratio will change directly in proportion to a increase in the vehicular speed.

The incremental change signal from the steer ratio filter is summed with a steer position reference signal provided from the steer/drive wheel of the vehicle. The summed signal is then fed to a position filter that provides a steer/drive wheel position signal. A position controller operatively connected to the gear reduction of the steer/drive wheel provides a feedback position signal of the gear reduction position, which is summed with the signal from the position filter. The new position signal is then fed to a motor velocity filter that provides a steer motor velocity signal to control the steering angle of the steer/drive motor. The motor velocity signal is summed with a motor velocity feedback signal provided by a velocity controller operatively connected to the steer motor. The summed motor velocity signals are then amplified and fed to the steer motor to change its steer ratio response as a function of the motor vehicle speed. In other words, a greater turn of the steering wheel will be required to effect an angle change in the steer/drive wheel as the speed of the material handling vehicle increases.

In a related application, Ser. No. 07/627,106, filed Dec. 13, 1990 for "Material Handling Vehicle Steering System" it is taught that the steering motor and drive motor for the steer/drive wheel can be combined or directly coupled together, to form a common steer/drive DC motor. In such a system, the aforementioned control circuitry does not require a motor velocity feedback signal, since the gear reducer is eliminated. Hence, the motor velocity controller and its associated feedback loop ar eliminated for a system utilizing a coupled steer/drive DC motor.

BRIEF DESCRIPTION OF THE DRAWINGS

A complete understanding of the present invention may be obtained by reference to the accompanying drawings, when taken in conjunction with the detailed description thereof and in which.

For purposes of brevity, like elements will bear the same designations throughout the figures.

DESCRIPTION OF THE PREFERRED EMBODIMENT

Generally speaking, the present invention features a new variable ratio steering system for the control of a motor vehicle, such as a material handling vehicle. As the speed of a material handling vehicle increases from a minimum speed threshold "a" to a maximum speed threshold "b", the steer ratio "R" of the steering control of the vehicle will be made to vary in accordance with the following straight-line function:

$$R = \frac{d-c}{b-a} \cdot V + \left[ c - \frac{(d-c)}{(b-a)} \cdot a \right]$$

where:
V = velocity of the material handling vehicle
c = a minimum steer ratio (turns lock-to-lock)
d = a maximum steer ratio (turns lock-to-lock).

Figure 1:
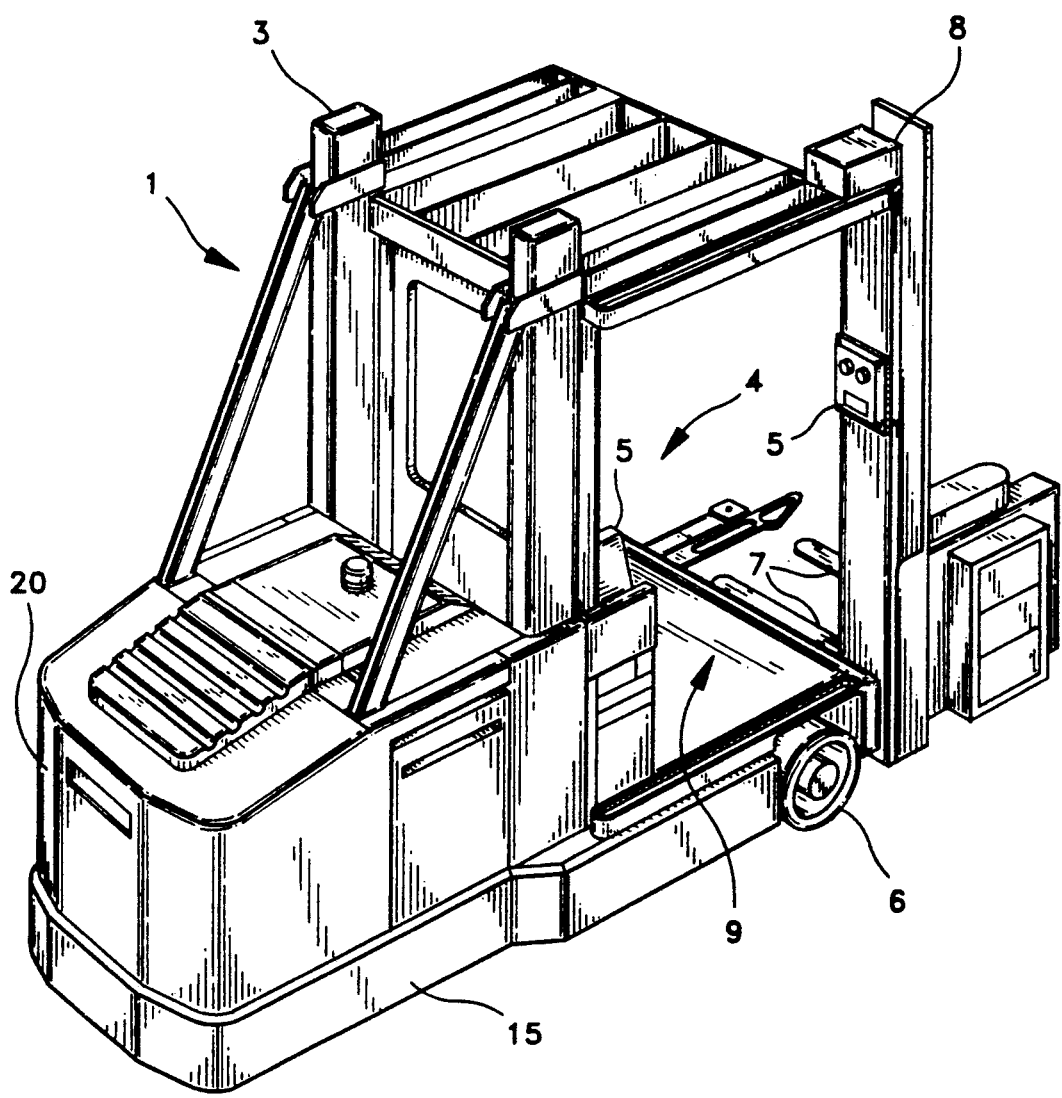
FIG. 1 is a perspective view of a material handling vehicle incorporating the variable ratio steering system of the present invention.

Referring now to FIG. 1, there is shown a perspective view of a material handling vehicle 1, the preferred embodiment being referred to as a lift truck. Vehicle 1 comprises a tractor frame 15, to which are mounted the major operating components of the vehicle 1, such as a main telescoping mast 3, to which is connected an elevating platform 9, an operator control station 4 with suitable displays 5, two non-steerable wheels 6, forks 7, and an auxiliary mast 8. A steering and drive system 20 is disposed at the rear of the vehicle 1 operatively connected to tractor frame 15 beneath a traction motor (not shown).

Figure 2:
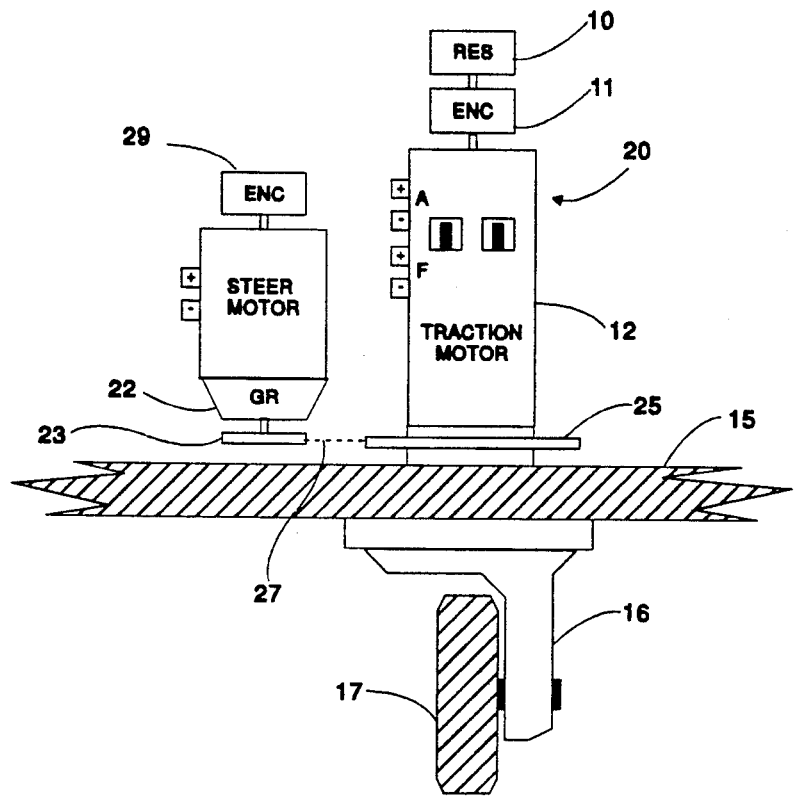
FIG. 2 is a schematic view, shown in sectional crosscut, of a gear reducer, pinion gear, chain driven, steering and drive motor system for a material handling vehicle.

Referring now also to FIG. 2, a conventional lift truck steering and drive system is shown generally at reference numeral 20. The steering and drive system 20 features a spaced-apart steer motor 21 and traction motor 12.

The material handling truck has a single, combination steering and drive wheel 17 that is driven by the traction motor 12 via an internal drive shaft (not shown). The internal drive shaft engages the steering and drive unit 16, which comprises a transmission that adapts the speed of the wheel 17 to that of the traction motor 12. The traction motor 12 and steering and drive unit 16 are attached and integrally mounted on the material handling truck frame 15.

A pinion gear 23 driven by the steer motor 21 through a gear reducer 22 drives a master gear 25 attached to the traction motor 12 via a drive chain 27. A steer motor speed sensor 29 is mounted upon the steer motor 21, which can be either an electric or a hydraulic motor. Steer motor speed sensor 29 detects the speed of steer motor 21.

A steer position sensor 10 and a travel speed sensor 11 are mounted upon the traction motor 12, as shown. Travel speed sensor 11 detects the speed of traction motor 12 on which it is mounted, while steer position sensor 10 detects drive unit steering position.

As an alternate embodiment of the steering/drive system, co-pending patent application Ser. No. 07/627,106, filed Dec. 13, 1990 for "Material Handling Vehicle Steering System," hereby incorporated by reference, describes a steer motor that directly couples with, and rotationally drives the traction motor. This eliminates the conventional pinion gear 23, the gear reducer 22, the master gear 25 and the drive chain 27, as well as the steer motor speed sensor 29, which is incorporated into the steer position sensor 10 of the traction motor 12. The function of the steer motor speed sensor 29 can thus be incorporated in the steer position sensor 10.

With the elimination of the drive chain, gear reducer and pinion gear components, the aforementioned system eliminates the problem of harmonic oscillation attendant with drive chain backlash. This improved steering system can likewise be further improved by incorporation of the present invention, as will be further explained herein with reference to FIG. 4b.

Figure 3:
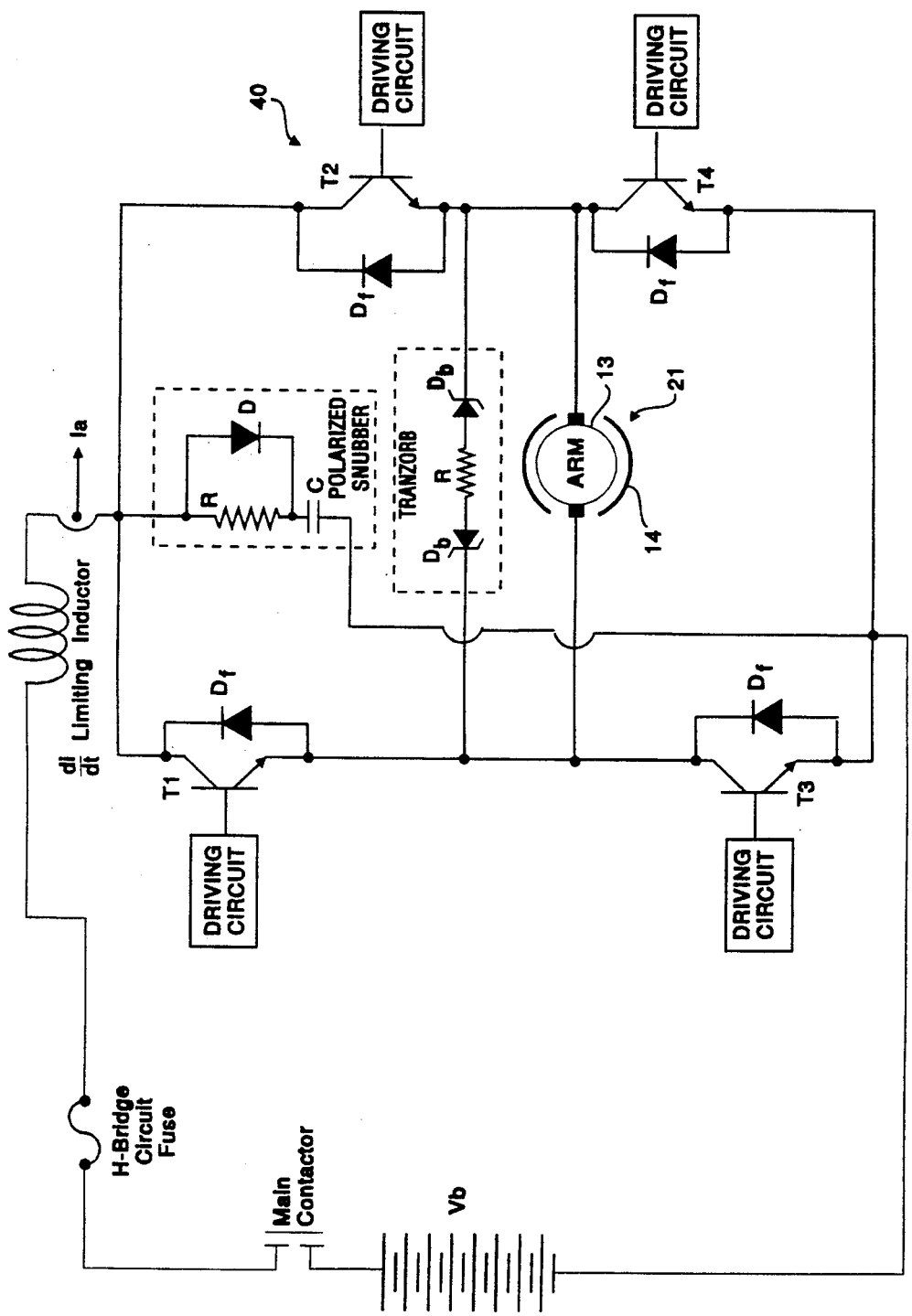
FIG. 3 is a diagrammatic view of the power control circuit for the variable ratio system of this invention.

Referring now also to FIG. 3, the power control circuit includes a transistorized, H-bridge armature voltage amplifier circuit 40 connected across the armature 13 of the steering motor 21. The H-bridge armature voltage amplifier circuit 40 determines the direction of dc motor rotation, and applies voltage to the armature. This power control circuit is under the influence of a microprocessor, not shown.

Figure 4A:
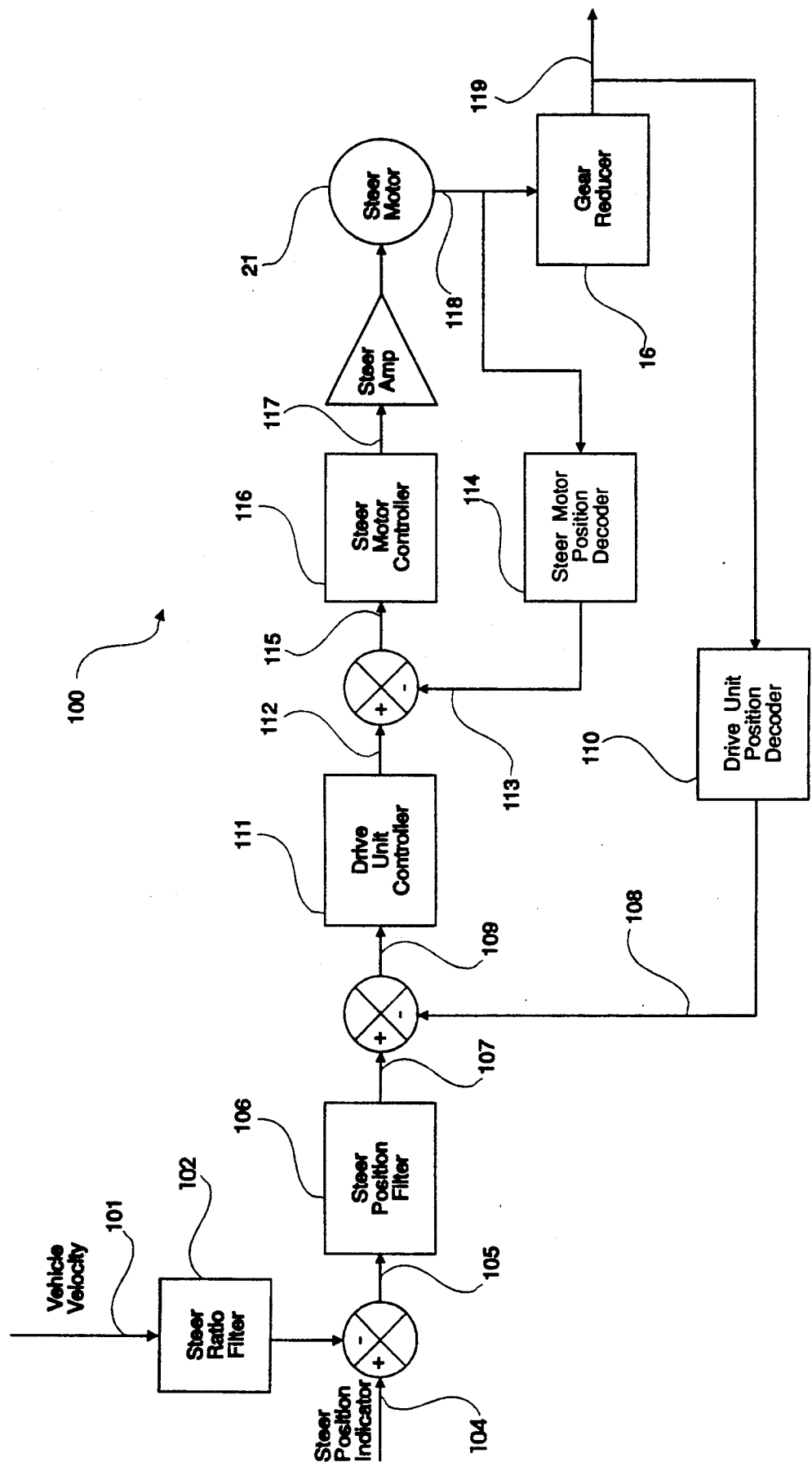
FIG. 4a is a block diagram of a feedback control circuit for the variable ratio steering system of the invention.
Figure 4B:
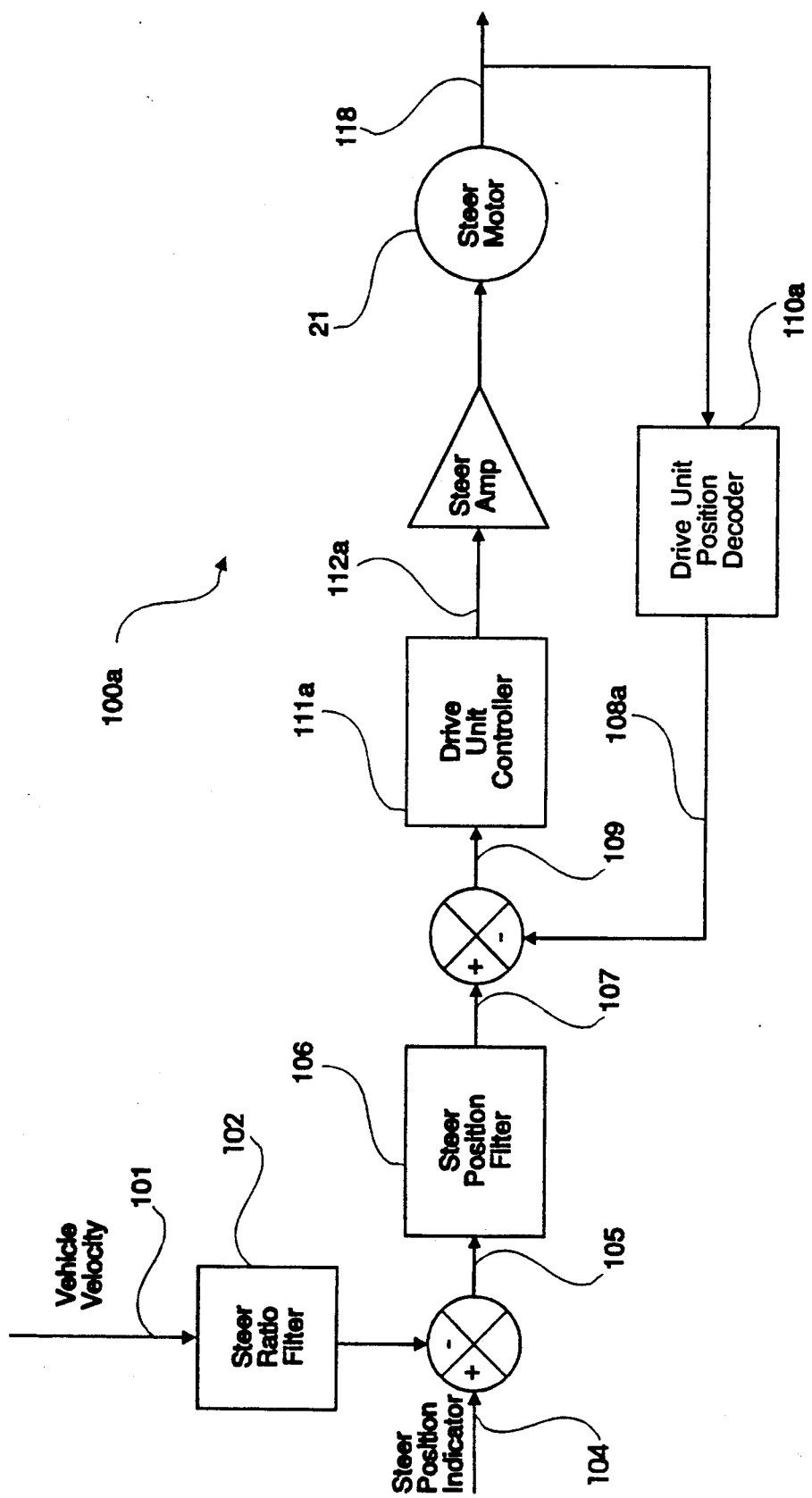
FIG. 4b is a block diagram of a feedback control circuit for an integrally coupled steering and drive motor embodiment of the invention.

Referring to FIG. 4a, a circuit for varying the steering ratio "R" as a function of the vehicle speed "V" is shown generally at reference numeral 100. The circuit 100 obtains a vehicle velocity reading from a velocity sensor (not shown), whose vehicle velocity signal 101 is fed to a steer ratio filter 102. The steer ratio filter 102 provides an incremental R signal 103 of changed steer ratio that is summed with a steer/drive wheel position reference signal 104 obtained from a steer/drive wheel sensor (not shown).

It should be understood that the system can also be adapted to operate as a velocity controller, rather than as a position controller, where the control system responds to a rate change of the input signal. For purposes of this description, however, position signals are described exclusively hereinafter.

Once the summing operation occurs, the summed position signal 105 is fed to steer position filter 106. The steer position filter 106 provides a signal 107 in response to the new position calculated for the steer/drive wheel 17 (FIG. 2). Signal 107 is then summed with a feedback signal 108, generated by drive unit position decoder 110, to which is applied the signal 119 from position feedback sensor 10 (FIG. 2). The resultant position signal 109 is then fed to a drive unit controller 111, as shown, which generates a signal 112 that is summed with the feedback signal 113 generated by steer motor position decoder 114, to which is applied the signal 118 from steer sensor 29 (FIG. 2). The resultant position signal 115 is then fed to a steer motor controller 116, which generates a signal 117 that is amplified and which controls the rotation of steer motor 21 via the driving circuit illustrated in FIG. 3.

In the embodiment of the directly driven steer/drive system illustrated and described in related application, Ser. No. 07/627,106, the need for a feedback signal 113, steer motor position decoder 114, and steer motor controller 116 is eliminated with the absence of the steer gear reducer 16, as aforementioned, giving rise to the circuit 100a, shown in FIG. 4b.

The steering ratio "R" will vary as follows:

$$R = c \quad \text{for } V < a$$
$$R = \frac{d-c}{b-a} \cdot V + \left[ c - \frac{(d-c)}{(b-a)} \cdot a \right] \quad \text{for } a \leq V \leq b$$
$$R = d \quad \text{for } V > b$$

where:
V = velocity of the material handling vehicle
a = minimum threshold speed
b = maximum threshold speed
c = minimum steer ratio (turns lock-to-lock)
d = maximum steer ratio (turns lock-to-lock).

Figure 5:
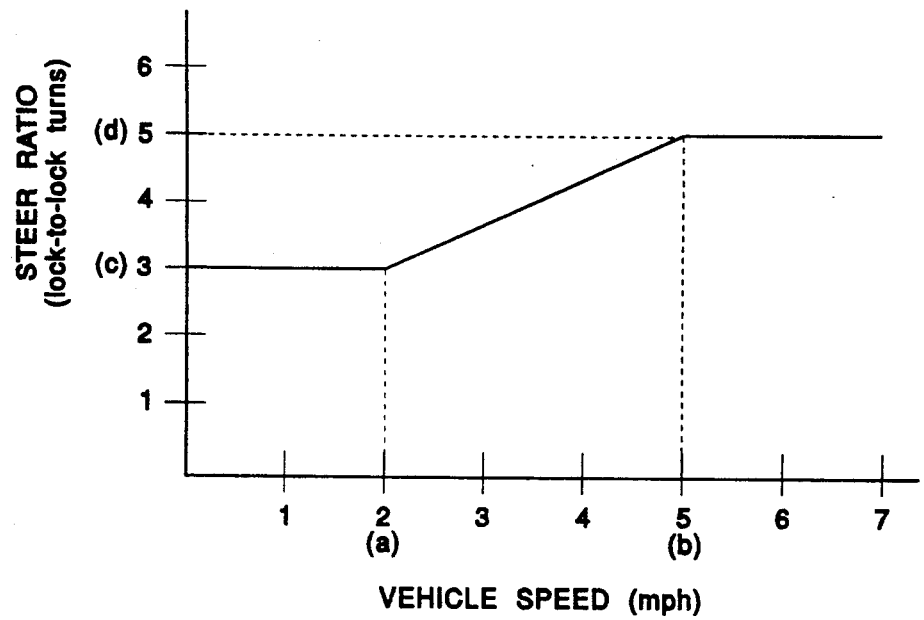
FIG. 5 is a graphical representation of steer ratio as a function of vehicle speed.

In other words, the steering ratio "R" varies in accordance with a straight-line function, between a minimum threshold speed "a", and a maximum threshold speed "b". These formulas are derived from the graph shown in FIG. 5. For vehicular speeds less than "a", the steering ratio will remain "c"; and for speeds greater than "b", the steering ratio will remain "d", as illustrated. Variables "a" through "d" and "V" may vary depending on the application.

While the above invention has been designed with respect to a linear correction of the steering ratio with respect to the speed of the vehicle, a non-linear correction could have been easily provided, if it had been desired to do so.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A variable steering ratio feedback control circuit for a material handling vehicle, comprising:
   a steer motor for steering a material handling vehicle via a steer/drive wheel;
   a steer ratio filter generating a steer ratio signal in response to a change in velocity of said vehicle;
   first summing means operatively connected to said steer ratio filter for summing a steering position reference signal with said steer ratio signal generated by said steer ratio filter to provide a first summed signal;
   a position filter for receiving said first summed signal and in response thereto, generating a steering position signal;
   a first feedback control means operatively connected to said steer motor for providing a feedback position signal with respect to said steer motor;
   second summing means operatively connected to said position filter and said first feedback control means for summing said steering position signal with said feedback position signal to provide a second summed signal; and
   a drive unit controller operatively connected to said second summing means for generating a motor velocity signal to said steer motor for steering said material handling vehicle, in response to said second summed signal.

2. The variable steering ratio feedback control circuit for a material handling vehicle in accordance with claim 1, further comprising:
   second feedback control means connected between said first feedback control means and said drive unit controller for generating a second feedback control signal; and
   third summing means operatively connected between said drive unit controller and said second feedback control means for summing said second feedback control signal with said motor velocity signal for controlling rotation of said steer motor.

3. The variable steering ratio feedback control circuit for a material handling vehicle in accordance with claim 1, wherein said steer ratio filter provides an incremental change in the steer ratio signal in response to said change in velocity of said material handling vehicle.

4. The variable steering ratio feedback control circuit for a material handling vehicle in accordance with claim 1, wherein said steer ratio filter provides a change in the steer ratio signal as a linear function of the velocity of said material handling vehicle.

5. The variable steering ratio feedback control circuit for a material handling vehicle in accordance with claim 4, wherein said steer ratio filter provides a change in the steer ratio signal as a linear function of the velocity of said material handling vehicle wherein a steering ratio "R" of said steer ratio signal will vary in accordance with a straight-line function, between a minimum threshold speed "a", and a maximum threshold speed "b", given by the formula:

$$R = \frac{d-c}{b-a} \cdot V + \left[ c - \frac{(d-c)}{(b-a)} \cdot a \right]$$

where:
V = velocity of the material handling vehicle
c = a minimum steer ratio (turns lock-to-lock)
d = a maximum steer ratio (turns lock-to-lock).

6. The variable steering ratio feedback control circuit for a material handling vehicle in accordance with claim 5, wherein said steering ratio "R" is substantially equal to a first constant when said velocity "V" is less than said minimum threshold speed "a" and said steering ratio "R" is substantially equal to a second constant when said velocity "V" is greater than said maximum threshold speed "b".

7. A variable steering ratio feedback control circuit for a material handling vehicle, comprising:
   a steer motor for steering a material handling vehicle via a steer/drive wheel;
   a steer ratio filter for generating a steer ratio signal in response to a change in velocity of said vehicle;
   first summing means operatively connected to said steer ratio filter for summing a steering position reference signal with said steer ratio signal generated by said steer ratio filter to provide a first summed signal;
   a position filter for receiving said first summed signal and in response thereto, generating a steering position signal;
   first feedback control means operatively connected to said steer motor for providing a feedback position signal with respect to said steer motor;

second summing means operatively connected to said position filter and said first feedback control means for summing said steering position signal with said feedback position signal to provide a second summed signal;

drive unit controller operatively connected to said second summing means for generating a motor velocity signal to said steer motor for steering said material handling vehicle, in response to said second summed signal;

second feedback control means connected between said first feedback control means and said drive unit controller for generating a second feedback control signal; and third summing means operatively connected between said drive unit controller and said second feedback control means for summing said second feedback control signal with said motor velocity signal for controlling rotation of said steer motor.

8. The variable steering ratio feedback control circuit for a material handling vehicle in accordance with claim 7, wherein said steer ratio filter provides an incremental change in the steer ratio signal in response to said change in velocity of said material handling vehicle.

9. The variable steering ratio feedback control circuit for a material handling vehicle in accordance with claim 7, wherein said steer ratio filter provides a change in the steer ratio signal as a linear function of the velocity of said material handling vehicle.

10. The variable steering ratio feedback control circuit for a material handling vehicle in accordance with claim 9, wherein said steer ratio filter provides a change in the steer ratio signal as a linear function of the velocity of said material handling vehicle wherein a steering ratio "R" of said steer ratio signal will vary in accordance with a straight-line function, between a minimum threshold speed "a", and a maximum threshold speed "b", given by the formula:

$$R = \frac{d-c}{b-a} \cdot V + \left[ c - \frac{(d-c)}{(b-a)} \cdot a \right]$$

where:
V = velocity of the material handling vehicle
c = a minimum steer ratio (turns lock-to-lock)
d = a maximum steer ratio (turns lock-to-lock)

11. The variable steering ratio feedback control circuit for a material handling vehicle in accordance with claim 10, wherein said steering ratio "R" is substantially equal to a first constant when said velocity "V" is less than said minimum threshold speed "a" and said steering ratio "R" is substantially equal to a second constant when said velocity "V" is greater than said maximum threshold speed "d".

* * * * *